United States Patent
Green (10) Patent No.: US 12,430,615 B2
(45) Date of Patent: Sep. 30, 2025

(54) VIRTUAL COLLABORATION ENVIRONMENT

(71) Applicant: Polaris Industries Inc., Medina, MN (US)

(72) Inventor: Erick M. Green, Brooklyn Park, MN (US)

(73) Assignee: Polaris Industries Inc., Medina, MN (US)

( * ) Notice: Subject to any disclaimer, the term of this patent is extended or adjusted under 35 U.S.C. 154(b) by 142 days.

(21) Appl. No.: 17/563,643

(22) Filed: Dec. 28, 2021

(65) Prior Publication Data

US 2022/0215342 A1    Jul. 7, 2022

Related U.S. Application Data

(60) Provisional application No. 63/133,592, filed on Jan. 4, 2021.

(51) Int. Cl.
*G06Q 30/00* (2023.01)
*G06Q 10/101* (2023.01)
(Continued)

(52) U.S. Cl.
CPC .......... *G06Q 10/101* (2013.01); *G06T 13/40* (2013.01); *G06T 19/20* (2013.01); *G06T 2219/024* (2013.01)

(58) Field of Classification Search
None
See application file for complete search history.

(56) References Cited

U.S. PATENT DOCUMENTS

| | | | | |
|---|---|---|---|---|
| 4,477,069 A | * | 10/1984 | Crudgington, Jr. | ... A63F 13/338 463/40 |
| 2008/0126021 A1 | * | 5/2008 | Hoguet | .................. G06T 19/00 703/1 |

(Continued)

OTHER PUBLICATIONS

Creativity and Learning in Digital Entertainment Games, Author: Hall, Johanna, Publication info: Open University (United Kingdom), ProQuest Dissertations Publishing, 2020. (Year: 2020).*

(Continued)

*Primary Examiner* — Matthew T Sittner
(74) *Attorney, Agent, or Firm* — Merchant & Gould, P.C.

(57) ABSTRACT

Aspects of the present disclosure relate to a virtual collaboration environment. In examples, a collaborator accesses the virtual collaboration environment using an extended reality device (e.g., an AR or VR headset). Properties may be presented within the virtual collaboration environment. For example, a three-dimensional model may be viewed from various angles and at varying distances. Further, properties may be updated during a collaboration session (e.g., using a computer-aided design application). In some instances, the perspective of a collaborator may be shared with other collaborators, thereby enabling the other collaborators to perceive properties from the same or a similar perspective. As another example, a collaboration session may be recorded, such that the session may be viewed at a later point in time. The recording may enable a collaborator to move freely within the virtual collaboration space and/or from the perspective of other collaborators that were present during the recording.

8 Claims, 7 Drawing Sheets

(51) Int. Cl.
*G06T 13/40* (2011.01)
*G06T 19/20* (2011.01)

(56) References Cited

U.S. PATENT DOCUMENTS

| | | | | |
|---|---|---|---|---|
| 2008/0158256 | A1* | 7/2008 | Russell | G06T 7/32 |
| | | | | 345/629 |
| 2012/0162384 | A1* | 6/2012 | Vesely | G06F 3/012 |
| | | | | 348/47 |
| 2014/0282229 | A1* | 9/2014 | Laukkanen | G06F 3/1454 |
| | | | | 715/788 |
| 2015/0102995 | A1* | 4/2015 | Shen | G09G 5/00 |
| | | | | 345/156 |
| 2017/0344663 | A1* | 11/2017 | Aliakbar Tabrizi | |
| | | | | G06F 16/9538 |
| 2018/0033203 | A1* | 2/2018 | Ligameri | G06F 3/1454 |
| 2019/0272674 | A1* | 9/2019 | Comer | G06F 3/04815 |
| 2020/0021668 | A1* | 1/2020 | Lyons | G06F 3/0304 |
| 2020/0258285 | A1* | 8/2020 | Dempsey | G06T 15/20 |
| 2022/0130103 | A1* | 4/2022 | Peuhkurinen | G06T 15/20 |
| 2023/0237432 | A1* | 7/2023 | Little | G06Q 10/10 |
| | | | | 715/751 |

OTHER PUBLICATIONS

Development and validation of virtual interactive tasks for an aviation English assessment, Author: Park, Moonyoung. Publication info: Iowa State University. ProQuest Dissertations Publishing, 2015. (Year: 2015).*

An institutional analysis of governance structures: How institutional carriers influence decision making in Brazilian environmental-education internet-mediated communities, Author: Hercheui, . . . Publication info: London School of Economics and Political Science (United Kingdom). 2007 (Year: 2007).*

* cited by examiner

FIG. 7

VIRTUAL COLLABORATION ENVIRONMENT

CROSS-REFERENCE TO RELATED APPLICATION

The present disclosure claims the benefit of U.S. Provisional Patent Application Ser. No. 63/133,592, filed Jan. 4, 2021, titled VIRTUAL COLLABORATION ENVIRONMENT, the entire disclosure of which is expressly incorporated by reference herein.

BACKGROUND

Collaboration using computing devices may be limited by the ability of such computing devices to present information, receive user input to interact with presented information, and enable collaborators to convey meaning to their other collaborators. Accordingly, remote collaboration may be less efficient and may have more associated overhead and frustration than in-person collaboration.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to a virtual collaboration environment. In examples, a collaborator perceives and interacts with the virtual collaboration environment using an extended reality device, such as an augment reality or virtual reality headset. One or more properties may be presented within the virtual collaboration environment, thereby enabling collaborators to perceive the properties accordingly. For example, a three-dimensional model may be viewed from various angles and at varying distances. Further, properties within the virtual collaboration environment may be updated during a collaboration session (e.g., using a computer-aided design application).

In some instances, the perspective of a collaborator may be shared with other collaborators, thereby enabling the other collaborators to perceive the virtual collaboration environment and properties therein from the same or a similar perspective. As another example, a collaboration session may be recorded, such that the session may be viewed at a later point in time. The recording may enable a collaborator to move freely within the virtual collaboration space and/or from the perspective of other collaborators that were present during the recording.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a group of collaborators may each use a respective computing device to collaborate. In some instances, one or more properties may be the subject of collaboration, including, but not limited to, three-dimensional (3D) models, textures, colors, aesthetics, user interfaces, and/or user experience aspects. As an example, collaboration may occur in an industrial design context in which the collaborators are designing aspects of a vehicle (e.g., the color, materials, finish (CMF) design, as well as body style and/or instrumentation). However, as compared to in-person collaboration, it may be difficult to ensure that each collaborator has a similar perception of the topic of collaboration. For example, differences between computing devices may affect the accuracy of color representation or size of features displayed by each respective computing device.

As another example, the nature of a property may make it difficult for collaborators to discuss specific aspects of the property. For instance, a 3D model may have various facets that can be observed from any number of perspectives including viewing angle, height, position, and orientation. Communicating the perspective from which a collaborator is viewing the 3D model to other collaborators may be difficult and may therefore detract from the quality of the collaboration. Thus, in some instances, a fixed representation of a property may be communicated, such as a screenshot or a rendered video from a fixed perspective. However, such techniques also limit collaboration, as a collaborator may then be unable to manipulate or otherwise interact with the property outside of the fixed representation.

Accordingly, aspects of the present disclosure relate to a virtual collaboration environment in combination with extended reality techniques to facilitate collaboration among collaborators. As used herein, extended reality includes, but is not limited to, augmented reality (AR), mixed reality (MR), and virtual reality (VR). Thus, it will be appreciated that a virtual collaboration environment need not be strictly virtual and may instead comprise virtual elements that are overlaid in a physical environment. For example, a collaborator may use an extended reality device such as a VR or an AR headset to view and/or interact with the virtual collaboration environment. In some instances, the virtual collaboration environment may also be accessible using a two-dimensional (2D) display, thereby enabling collaborators to view the virtual collaboration environment without an extended reality device. For example, a mobile computing device may be used (e.g., in conjunction with an image capture device and AR techniques) to "overlay" the virtual collaboration environment on top of the physical environment of the collaborator. As another example, the virtual collaboration environment may be rendered and displayed on the 2D display according to a perspective of another collaborator (e.g., one using an extended reality device) or of a fixed or user-controllable camera within the virtual collaboration environment.

One or more properties may be presented within the virtual collaboration environment, enabling collaborators to view, hear, or otherwise interact with the properties. For example, a 3D model may be presented within the virtual collaboration environment, such that a collaborator may view the 3D model from various perspectives. A collaborator may adjust the position of the 3D model within the environment or, as another example, may manipulate the perspective from which the virtual collaboration environment is perceived by the collaborator. Thus, each collaborator may have a perspective within the virtual collaboration environment from which the collaborator perceives properties within the virtual collaboration environment.

The perspective of a collaborator may be shared with other collaborators, thereby enabling each collaborator to perceive the virtual collaboration environment and properties therein from the same or a similar perspective. Such aspects may facilitate collaboration, as collaborators need not communicate information to other collaborators in order to attempt to manually coordinate perspectives within the virtual collaboration environment. In some instances, rather than being restricted to the perspective shared by a presenting collaborator, aspects described herein may enable a perspective of a collaborator to deviate from the shared perspective within a certain threshold or freely, thereby enabling the collaborator to both interact with the property from the shared perspective while also providing freedom to evaluate the property from other, potentially related perspectives. For example, a property may be presented to the collaborator using the shared perspective, but the collaborator may wish to deviate slightly so as to gain additional context (e.g., according to a different size or viewing angle, etc.) relating to the property. In such instances, a control or other user interface element may be provided that offers the option to revert the perspective of the collaborator to the shared perspective.

In some instances, collaborators may use the same type or model of extended reality device or may use extended reality devices that have the same or a similar set of capabilities. For example, each extended reality device may have the same or a similar resolution, pixel density, or color accuracy. In other instances, multiple classes of extended reality devices may be used, such that an AR class of extended reality devices has one set of shared or otherwise similar capabilities, while a VR class of extended reality devices has another set of shared or otherwise similar capabilities. Thus, perception variability between collaborators may be reduced as a result of using similar devices, thereby enabling collaborators to evaluate properties in the virtual collaboration environment with greater consistency.

A collaboration session may be recorded, thereby enabling subsequent "playback" (e.g., by a collaborator that was unable to attend). In such instances, later playback may enable a collaborator to move about the virtual collaboration environment as though the collaborator were present initially or, as another example, the collaborator may be able to view the virtual collaboration environment from the same perspective or, as another example, a deviated perspective (e.g., within a certain threshold or freely) of any of the attendees (e.g., a shared perspective or the perspective of other collaborators). In some instances, a collaborator may consent or otherwise indicate (e.g., via a user preference) that his or her perspective can be recorded during the collaboration session, such that only a subset of perspectives may be available for collaboration session playback. Thus, as compared to fixed property representations, a collaborator may experience greater engagement with one or more properties of the virtual collaboration environment.

A property of a virtual collaboration environment may be added, imported, or otherwise accessed from software with which it was created or modified. For example, a computer-aided design (CAD) application may be used to design a 3D model, such that the 3D model may be brought into the virtual collaboration environment for discussion with collaborators. In some instances, the 3D model may be modified during the collaboration session (e.g., responsive to feedback from collaborators). Thus, the 3D model may be revised in the CAD application and updated in the virtual environment accordingly.

It will be appreciated that any of a variety of systems and associated paradigms may be used to implement the aspects described herein. For example, a client/server paradigm may be used, where each collaborator uses a client (e.g., an extended reality device and/or a computing device) that is in communication with a server to access the virtual collaboration environment described herein. For example, the server may provide information associated with properties within the virtual collaboration environment (e.g., models, textures, sounds, position information, and/or user interface aspects) and/or may transmit perspective information for collaborators, thereby enabling collaborators to view the relative position of other collaborators within the virtual collaboration environment.

In some instances, a collaborator may be represented in the virtual collaboration environment by an avatar. In other instances, an indication as to the collaborator's perspective may be displayed (e.g., highlighting one or more visible surfaces or generating a shape representing the field of view of a collaborator), thereby enabling a collaborator to see what other collaborators are viewing. In some instances, a collaborator may determine to view the virtual collaboration environment from the perspective of another collaborator. For example, a collaborator may actuate an avatar of another collaborator or a representation of a collaborator's field of view to assume the perspective associated with the collaborator.

A server need not be used and, in other examples, computing devices may communicate with one another to facilitate collaboration in a virtual collaboration environment according to aspects described herein. As another example, an extended reality device may be pre-associated with a server (or, in other examples, one or more other extended reality devices and/or other computing devices) such that it is pre-configured to access one or more virtual collaboration environments (e.g., with virtual private network (VPN)

information or associated collaboration sessions and/or virtual collaboration environments). A collaboration session and/or a virtual collaboration environment may have an associated identifier, such that different collaboration sessions and/or virtual collaboration environments may be accessed according to the associated identifier. For example, the same virtual collaboration environment may be used for different collaboration sessions.

Aspects described herein may be used to facilitate collaboration in any of a variety of contexts. For example, at an early stage of the design process, a 3D model of a vehicle may be the subject of collaboration in a virtual collaboration environment. In some instances, the 3D model may be used to from a clay model in a physical environment, such that the vehicle design may then be further refined in the physical environment. The initial 3D model may be updated or a new 3D model may be generated based on the refined clay model, after which rollover protection structure (ROPS) shapes may be modified and/or openings may be added or deleted in the virtual collaboration environment, among other examples. The virtual collaboration environment may be used to perform simulated color reviews and/or to add, modify, or remove graphics associated with the vehicle.

In some instances, multiple versions of the model may be evaluated in the virtual collaboration environment, for example a base model and a premium model, or based on different options (e.g., adding accessories or to evaluate different body style options). The virtual collaboration environment may enable collaborators to interact with or otherwise manipulate the property, for example by open/closing the trunk, the hood, and/or the doors, as well as removing various panels of the 3D model. The virtual collaboration environment may further enable collaborators to alter properties of the environment itself, such as lighting (e.g., spotlights, lighting temperature, or according to a simulated time of day and/or position of the sun) or a scene in which the properties are presented (e.g., a city scene, a rural scene, or a wilderness scene).

Figure 1:
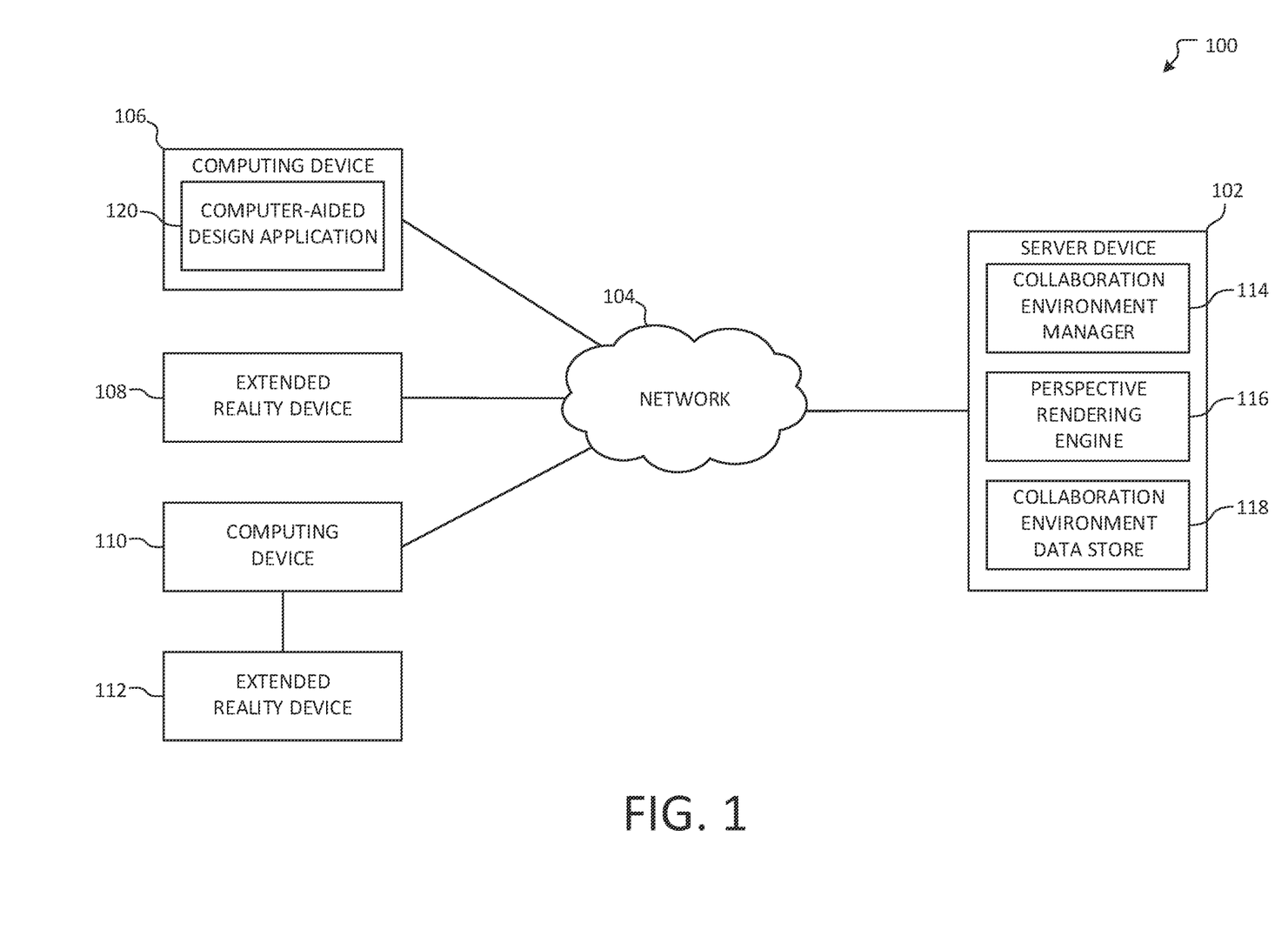
FIG. 1 illustrates an overview of an example system for a virtual collaboration environment.

FIG. 1 illustrates an overview of an example system 100 for a virtual collaboration environment. As illustrated, system 100 comprises server device 102, computing device 106, extended reality device 108, computing device 110, and extended reality device 112. In examples, server device 102, computing device 106, extended reality device 108, and computing device 110 communicate via network 104, which may comprise a local area network, a wireless network, a virtual private network, or the Internet, or any combination thereof, among other examples.

Server device 102 may be a server computing device or a set of computing devices that form a distributed computing device, among other examples. Computing device 106 and computing device 110 may each be any of a variety of computing devices, including, but not limited to, a mobile computing device, a laptop computing device, a tablet computing device, or a desktop computing device. Extended reality device 108 may be a standalone extended reality device and may therefore have capabilities similar to those of a mobile computing device or any of a variety of other computing devices. By contrast, extended reality device 112 is illustrated as connecting to computing device 110, such that computing device 110 may perform at least a part of the processing and/or networking operations for extended reality device 112.

It will be appreciated that while system 100 is illustrated as comprising one server device 102 and four devices 106, 108, 110, and 112, any number of such elements may be used in other examples. For example, any number of extended reality devices and/or computing devices may be used. As an example, a single computing device may be used in combination with any number of extended reality devices. Further, the functionality described herein with respect to server device 102 and devices 106, 108, 110, and 112 may be distributed among or otherwise implemented on any number of different computing devices in any of a variety of other configurations in other examples. As an example, server device 102 may be omitted, such that the aspects described herein with respect to server device 102 may instead be implemented by one or more of devices 106, 108, 110, and/or 112.

Server device 102 is illustrated as comprising collaboration environment manager 114, perspective rendering engine 116, and collaboration environment data store 118. In examples, collaboration environment manager 114 receives perspective information for collaborators within a virtual collaboration environment (e.g., as may be received from devices 106, 108, 110, and/or 112). Example perspective information includes, but is not limited to, a camera position (e.g., according to an X, Y, Z coordinate system), one or more angles (e.g., a roll, pitch, and/or yaw), and/or an indication of an associated avatar for the collaborator. Accordingly, collaboration environment manager 114 may transmit such perspective information to other computing devices associated with the virtual collaboration environment. In some instances, collaboration environment manager 114 may transmit an indication that sharing has been initialized by a collaborator of a device, thereby causing other devices to present the virtual collaboration environment according to the shared perspective of the collaborator. In such instances, collaboration environment manager 114 may no longer relay perspective information for collaborators that are not presenting.

Collaboration environment manager 114 may process requests for properties of the virtual collaboration environment, for example providing at least a part of the data associated with such properties (e.g., as may be stored by collaboration environment data store 118). In some instances, collaboration environment manager may receive a new or updated property (e.g., from computer-aided design application 120 of computing device 106), such that the property is stored in collaboration environment data store 118 and/or an indication is provided to devices associated with the virtual collaboration environment. As a result, the new or updated property may be presented to collaborate via the virtual collaboration environment as described herein.

Server device 102 further comprises perspective rendering engine 116. In some instances, a virtual collaboration environment may be accessed without using an extended reality device. For example, computing device 106 is illustrated without an associated extended reality device. In such instances, server device 102 may generate a video stream associated with the virtual collaboration environment, such that the video stream may be presented by computing device 106, thereby enabling a collaborator to view the virtual collaboration environment without requiring an extended reality device. The video stream may be generated according to one or more perspectives (e.g., of collaborators or of cameras) within the collaboration environment. In some instances, a collaborator of computing device 106 may control the perspective from which the virtual collaboration environment is viewed or, as another example, another collaborator may specify the perspective for the video stream. It will be appreciated that, in other examples, perspective rendering engine 116 of server device 102 may be omitted, such that the virtual collaboration environment is rendered by computing device 106 (e.g., using properties from collaboration environment data store 118) or, as another example, rendering may be performed according to a perspective of a collaborator that is being viewed, such that one of devices 108, 110, or 112 may generate the video stream for computing device 106 as the collaborator of computing device 106 views the virtual collaboration environment from the perspective of the other collaborator accordingly.

Collaboration environment data store 118 of server device 102 stores data associated with the virtual collaboration environments provided by server device 102. For example, collaboration environment data store 118 may store properties, avatars, identifiers associated with collaboration sessions and/or virtual collaboration environments, and/or recorded session information. For example, a property may be received from computer-aided design application 120 and stored in collaboration environment data store 118. As another example, server device 102 may receive a request for a recording associated with a previous collaboration session, which may be identified in collaboration environment data store 118 according to an associated identifier. The recorded collaboration session may be provided in a way that enables the requesting device to render the virtual collaboration environment or, as another example, may be rendered by perspective rendering engine 116 and provided as a video stream in response.

Thus, server device 102 enables devices 106, 108, 110, and 112 to generate and present the described virtual collaboration environment to collaborators associated with each respective device. For example, extended reality device 108 may receive, request, or otherwise access one or more properties and associated information (e.g., position information, scaling information, etc.) and use such information to generate the virtual collaboration environment accordingly. The collaborator may move within the virtual collaboration environment and interact with properties therein. Extended reality device 108 may provide an indication as to the collaborator's interaction with a property of the virtual collaboration environment, such that server device 102 may relay such information to enable other collaborators to view such interactions. As another example, extended reality device 108 may detect movements of the collaborator using data received from one or more inertial measurement units (IMUS) or based on determining the position of the collaborator in relation to fixed objects of the surrounding physical environment, among other movement detection techniques. As a result, extended reality device 108 may update the perspective and associated presentation of the virtual collaboration environment. Further, extended reality device 108 may provide an indication of the collaborator's updated perspective to server device 102, where it may be relayed to other devices and presented to collaborators as described above.

Figure 2:
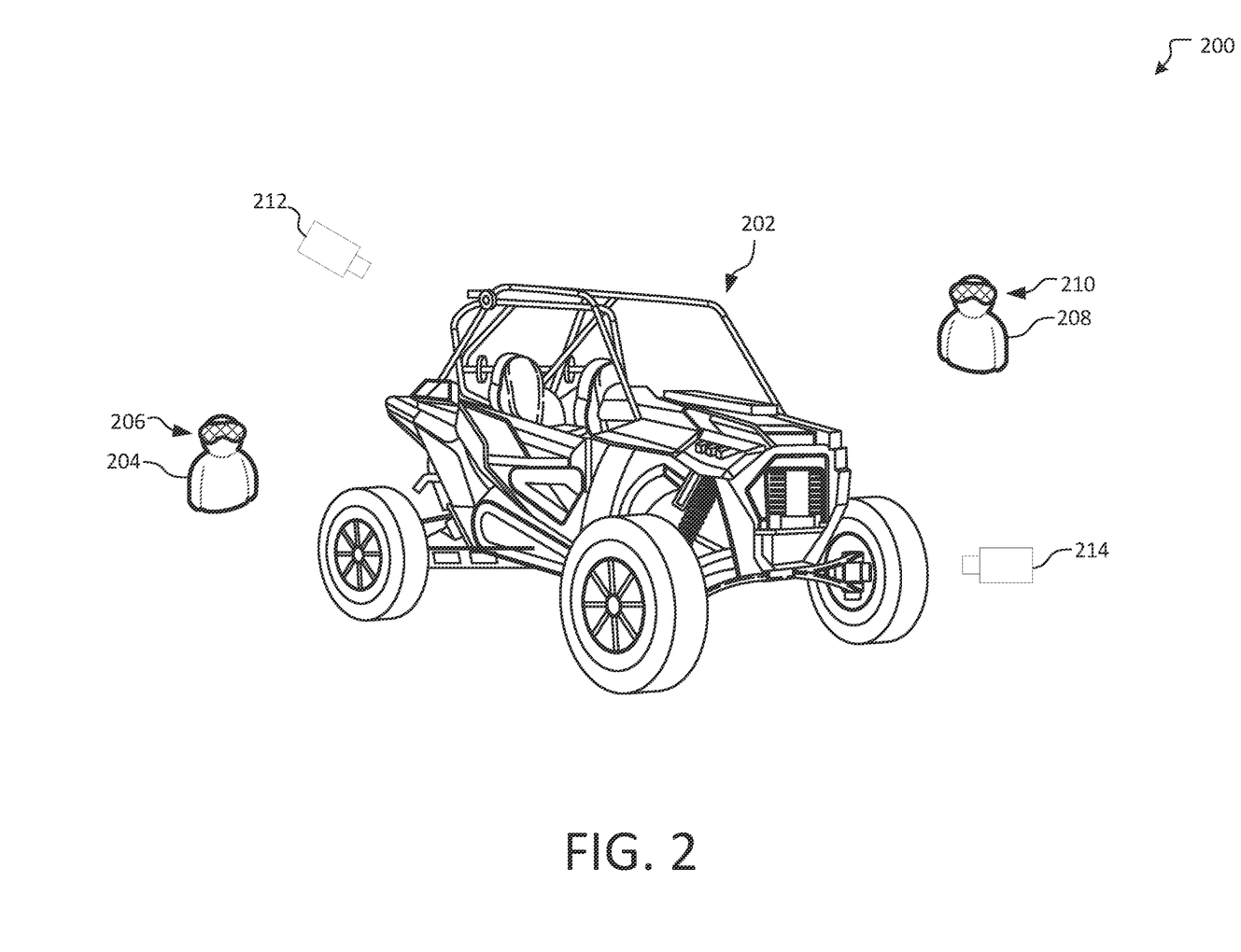
FIG. 2 illustrates an overview of an example virtual collaboration environment according to aspects of the present disclosure.

FIG. 2 illustrates an overview of an example virtual collaboration environment 200 according to aspects of the present disclosure. As illustrated, virtual collaboration environment 200 comprises property 202, collaborator 204 using extended reality device 206, collaborator 208 using extended reality device 210, and cameras 212 and 214. In examples, extended reality devices 206 and 210 may each be either a standalone extended reality device (e.g., extended reality device 108 in FIG. 1) or may utilize a computing device to perform at least a part of the associated processing and/or network operations (e.g., extended reality device 112 and computing device 110).

Property 202 is illustrated as a 3D model, as may be associated with computer-aided design application 120 in FIG. 2. Thus, as an example, property 202 may be added, imported, or otherwise accessed for inclusion in virtual collaboration 200 from such software. In examples, property 202 is accessed from a collaboration environment data store, such as collaboration environment data store 118 in FIG. 1. In other examples, virtual collaboration environment 200 may comprise any of a variety of other properties in addition to or as an alternative to property 202. For example, virtual collaboration environment 202 may comprise sounds, textures and/or colors (e.g., as may be applied to property 202), aesthetics, user interfaces, and/or user experience aspects. It will be appreciated that while virtual collaboration environment 200 is illustrated as comprising a single property 202 in the form of a 3D model, any number and/or variety of property types may be used according to aspects described herein. Further, it will be appreciated that a property need not be strictly associated with virtual space may additionally or alternatively be superimposed over a physical object according to AR and/or MR techniques.

Collaborators 204 and 208 may view, manipulate, or otherwise interact with property 202. For example, collaborator 204 may cause the perspective presented by extended reality device 206 to change within virtual collaboration environment 200 by moving in physical space or providing other user input (e.g., one or more gestures, keyboard input, mouse input, or touchscreen input). Similarly, collaborator 208 may provide an indication to extended reality device 210 that causes extended reality device 210 to adjust a zoom level, scaling factor, or position of the rendered perspective, thereby enabling collaborator 208 to view property 202 closer and/or at a higher level of detail.

Cameras 212 and 214 provide perspectives within virtual collaboration environment 200 from which collaborators may view property 202. For example, a collaborator that does not have an extended reality device may view the virtual collaboration environment 200 using camera 212 or camera 214. As another example, the collaborator may view the virtual collaboration environment from the perspective of extended reality device 206 (e.g., of collaborator 204) or extended reality device 210 (e.g., of collaborator 208). In some instances, cameras 212 and/or 214 are fixed or, in other instances, they may be user-controllable.

In examples, virtual collaboration environment 200 comprises avatars associated with collaborators 204 and 208 that are presented according to their respective perspectives accordingly. Thus, collaborator 204 is able to determine where and/or what collaborator 208 is looking at and vice versa. Accordingly, a collaboration environment manager such as collaboration environment manager 114 in FIG. 1 may relay perspective information associated with the current perspective of each collaborator. Similarly, visual representations for cameras 212 and 214 may be presented within virtual collaboration environment 200.

As described above, collaborator 204 and/or 208 may share an associated perspective in virtual collaboration environment 200 with other collaborators. For example, collaborator 204 may share the perspective rendered by extended reality device 206 with collaborator 208, such that extended reality device 210 similarly renders virtual collaboration environment 200 from the perspective of extended reality device 206, even though collaborator 208 is at a different relative location with respect to property 202. In some instances, collaborator 208 may still provide an indication to extended reality device 210 to move the shared perspective. This may cause a deviation from the shared perspective (e.g., according to a predetermined threshold or freely) that is presented only to collaborator 208 or, as another example, the deviation may cause the perspective to change for all collaborators that are viewing the shared perspective. Such aspects need not be limited to perspectives of extended reality devices 206 and 210, and may similarly be applied to cameras 212 and 214.

While virtual collaboration environment 200 is illustrated as comprising a single property, two cameras, and two collaborators that each have an extended reality device, it will be appreciated that any number of such elements may comprise a virtual collaboration environment in other examples. For instance, a virtual collaboration environment may comprise no cameras such that each collaborator instead perceives the virtual collaboration environment using an extended reality device. As another example, a single extended reality device may be used by a collaborator, such that other collaborators perceive the virtual collaboration environment from the perspective of that extended reality device according to aspects described herein. In other examples, multiple properties may be presented.

Figure 3:
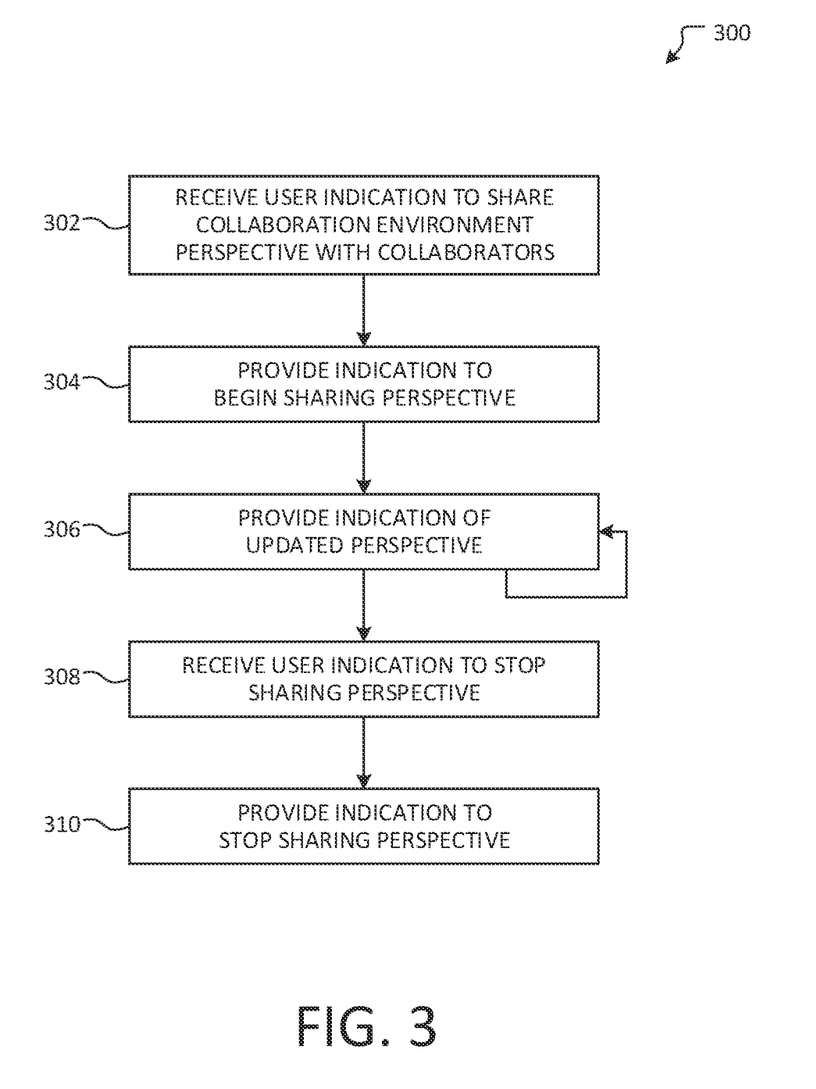
FIG. 3 illustrates an overview of an example method for initiating perspective sharing in a virtual collaboration environment.

FIG. 3 illustrates an overview of an example method 300 for initiating perspective sharing in a virtual collaboration environment. Aspects of method 300 may be performed by a device of a collaborator, such as computing devices 106 or 110, or extended reality devices 108 or 112 in FIG. 1. For example, method 300 may be performed by a computing device that is providing a shared perspective to devices of other collaborators.

Method 300 begins at operation 302, where a user indication is received to share a collaboration environment perspective with collaborators. For example, a user interface element may be actuated by the collaborator, a voice command may be received, or any of a variety of other user indications may indicate an instruction by the collaborator to begin perspective sharing.

Flow progresses to operation 304, where an indication is provided to begin sharing the perspective of the collaborator. For example, the indication may be provided to a server device such as server device 102 in FIG. 1, such that the server device may relay the indication to other devices. In other examples, the indication may be provided to devices of other collaborators without use of such an intermediary server device.

At operation 306, an indication of an updated perspective is provided. Similar to operation 304, the indication may be provided to a server device such that the server device may relay the updated perspective information to other devices or, as another example, the indication may be provided to devices of other collaborators. Example perspective information includes, but is not limited to, a camera position for the collaborator, one or more angles associated therewith, and/or an indication of an associated avatar for the collaborator. Thus, the information may be used to update the perspective rendered by other devices, such that the other devices present a similar perspective of the virtual collaboration environment as is being viewed by the collaborator.

An arrow is illustrated from operation 306 that returns to operation 306 to indicate that flow may loop at operation 306 for the duration of the sharing session, such that other collaborators continue to receive perspective updates. Perspective updates may be sent periodically (e.g., every second or ten times a second) or when the shared perspective changes (e.g., within a predetermined threshold or any change). It will be appreciated that, in addition or as an alternative to providing perspective information, other examples may comprise rendering the virtual collaboration environment and providing a video stream of the rendered virtual collaboration environment to devices of other collaborators.

Eventually, flow progresses to operation 308, where a user indication is received to stop sharing the perspective with other collaborators. Similar to operation 302, the user indication may be received via a user interface element, as a voice command, or as any of a variety of other user indications that may indicate an instruction by the collaborator to stop perspective sharing.

Accordingly, at operation 310, an indication is provided to stop perspective sharing. For example, the indication may be provided to a server device such as server device 102 in FIG. 1, such that the server device may relay the indication to other devices. In other examples, the indication may be provided to devices of other collaborators without use of such an intermediary server device. Method 300 terminates at operation 310.

Figure 4:
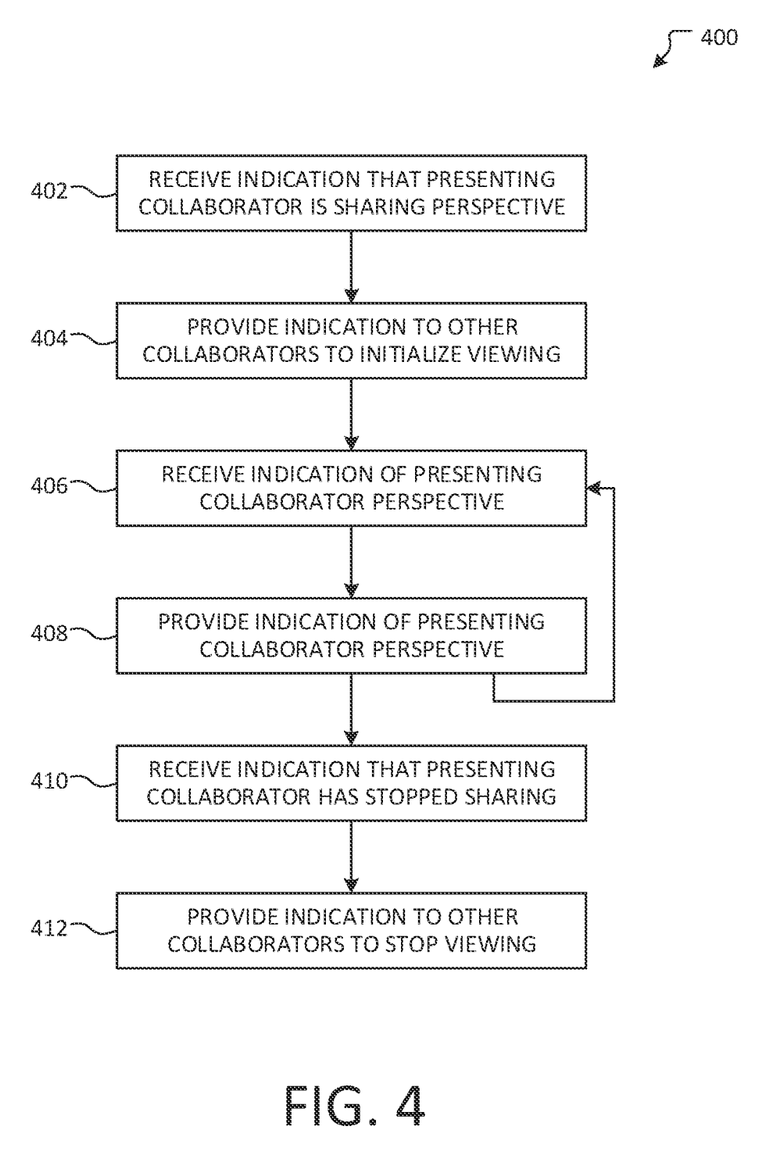
FIG. 4 illustrates an overview of an example method for providing a shared perspective to computing devices of other collaborators in a virtual collaboration environment.

FIG. 4 illustrates an overview of an example method for providing a shared perspective to computing devices of other collaborators in a virtual collaboration environment. Aspects of method 400 may be performed by a server device, such as server device 102 in FIG. 1. Method 400 begins at operation 402, where an indication is received that a collaborator is initiating perspective sharing. For example, the indication may be received as a result of a collaborator device (e.g., device 106, 108, 110, or 112 in FIG. 1) performing aspects of operation 304 of method 300 in FIG. 3.

Flow progresses to operation 404, where an indication is provided to other collaborator devices to initialize viewing of the shared perspective. In some instances, the indication comprises information associated with the collaborator that initiated perspective sharing, such as a collaborator name and/or information associated with a collaborator avatar.

At operation 406, an indication of the perspective of the presenting collaborator is received. For example, the indication may be received as a result of the device of the presenting collaborator performing aspects of operation 306 of method 300 in FIG. 3. The indication may comprise perspective information. Flow progresses to operation 408, where an indication of the presenting collaborator perspective is provided to devices of other collaborators. In some instances, operation 408 comprises validating the perspective information or translating the perspective information from a local coordinate system used by the collaborator device to a shared coordinate system.

In other examples, operation 408 comprises rendering the virtual collaboration environment based on the perspective information, such that a video stream (e.g., as may be generated by a perspective rendering engine such as perspective rendering engine 116 in FIG. 1) may be provided to at least some of the devices of the other collaborators. An arrow is illustrated from operation 408 to operation 406 to illustrate that flow may loop between operations 406 and 408 for the duration of the sharing session, such that the shared perspective is relayed between the presenting device and the viewing devices. Perspective updates may be relayed periodically (e.g., every second or ten times a second) or when the shared perspective changes (e.g., within a predetermined threshold or any change). For example, the presenting device may provide periodic updates (e.g., which may be received at operation 406), while perspective updates may be relayed (e.g., at operation 408) only when a perspective change exceeds a predetermined threshold.

Flow eventually progresses to operation 410, where an indication is received that the presenting collaborator has stopped sharing. For example, the indication may be received as a result of the collaborator device performing aspects of operation 310 of method 300 in FIG. 3.

Accordingly, at operation 412, an indication is provided to other collaborator devices to stop viewing the shared perspective. In some instances, operation 412 comprises ending a video stream that is being provided of the shared perspective. Method 400 ends at operation 412.

Figure 5:
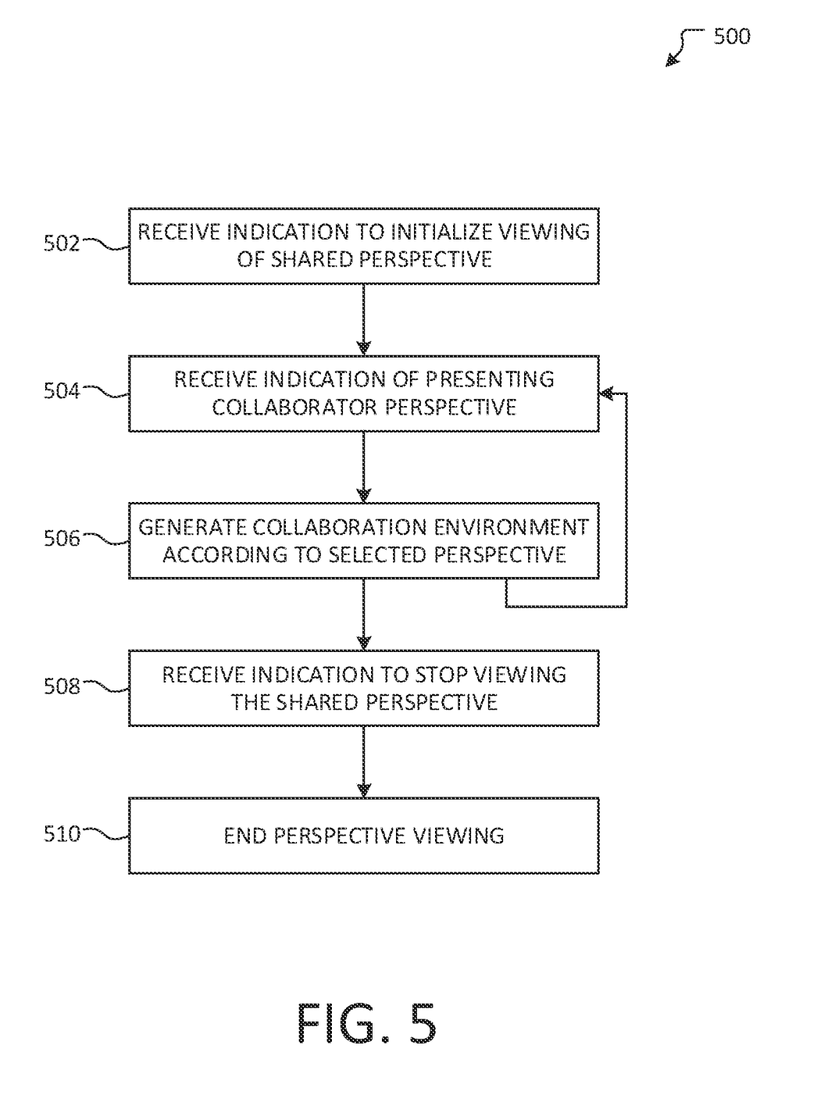
FIG. 5 illustrates an overview of an example method for generating a virtual collaboration environment according to a shared perspective.

FIG. 5 illustrates an overview of an example method 500 for generating a virtual collaboration environment according to a shared perspective. Aspects of method 500 may be performed by a device of a collaborator, such as computing devices 106 or 110, or extended reality devices 108 or 112 in FIG. 1. For example, method 500 may be performed by a computing device that is receiving a shared perspective for a virtual collaboration environment.

Method 500 begins at operation 502, where an indication to initialize viewing of a shared perspective for a virtual collaboration environment. In examples, the indication is received from a device performing aspects of operation 304 in FIG. 3 or aspects of operation 404 in FIG. 4. In some instances, operation 502 comprises displaying a notification that a collaborator has initialized perspective sharing.

Flow progresses to operation 504, where an indication of the perspective of a presenting collaborator is received. The indication may comprise perspective information associated with the perspective of the presenting collaborator in the virtual collaboration environment. Accordingly, at operation 506, the virtual collaboration environment is presented according to the perspective of the presenting collaborator. The collaboration environment may be rendered by the device (e.g., using a perspective rendering engine such as perspective rendering engine 116 in FIG. 1) or, in other examples, operation 506 comprises displaying a video stream (e.g., as may be received from the presenting collaborator device or a server device, among other examples). As described above, the shared perspective may be adjusted freely or within a certain to threshold such that it deviates from the shared perspective, thereby enabling the collaborator to vary interactions with properties of the virtual collaboration environment. The deviation may be presented locally or may be communicated to other devices such that the shared perspective is updated accordingly.

An arrow is illustrated from operation 506 to operation 504 to illustrate that flow may loop between operations 504 and 506 for the duration of the sharing session, such that the perspective displayed by the device executing method 500 reflects that of the presenting collaborator.

At operation 508, an indication is received to stop viewing the shared perspective. In examples, the indication is received from a device performing aspects of operation 310 in FIG. 3 or aspects of operation 412 in FIG. 4. Accordingly, flow progresses to operation 510, where perspective viewing ends. For example, full control may be returned to the collaborator either from the shared perspective or, as another example, the perspective used to render the virtual collaboration environment may be returned to the perspective of the collaborator prior to when the sharing session began. Method 500 terminates at operation 510.

Figure 6:
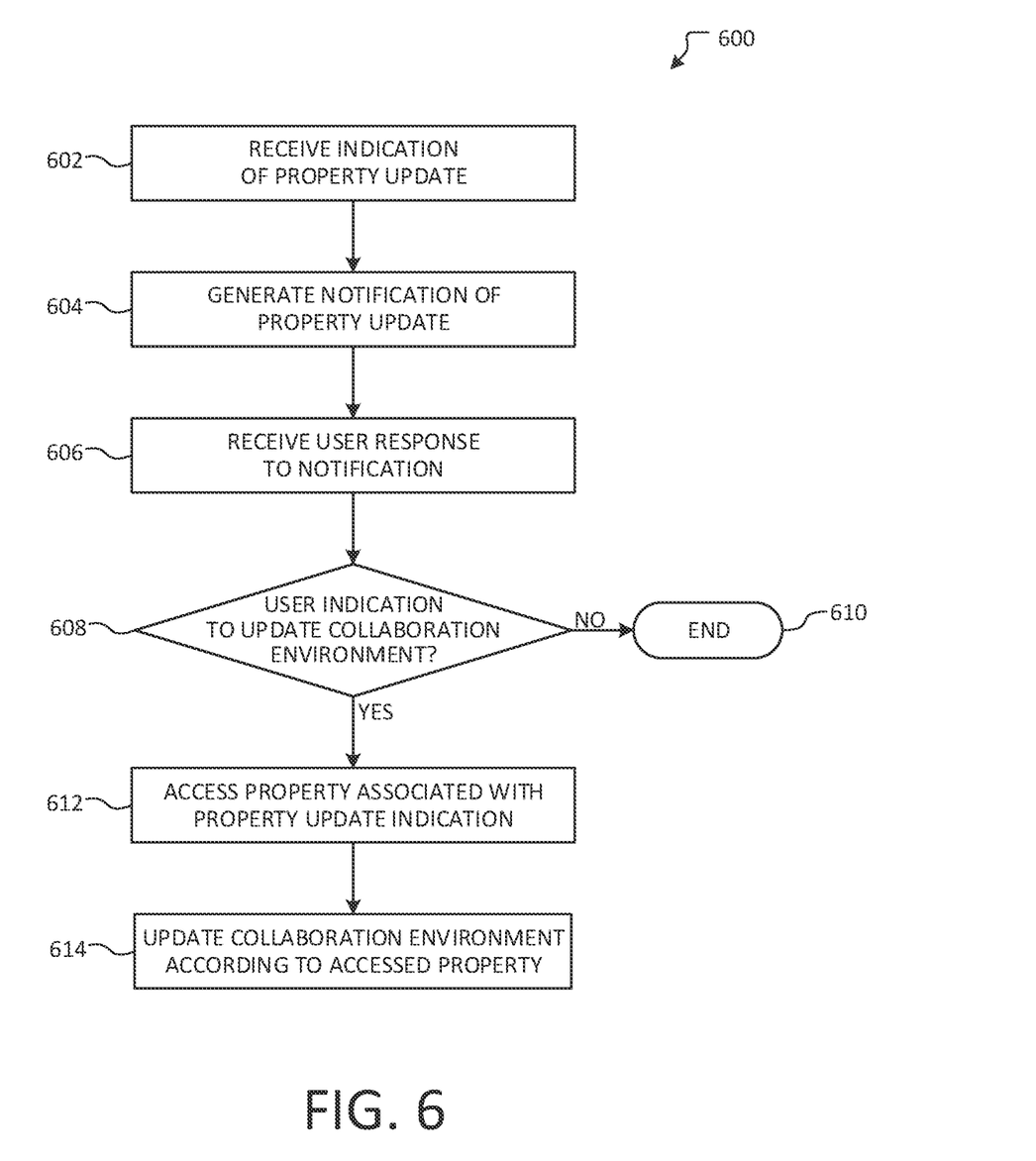
FIG. 6 illustrates an overview of an example method for updating a property of a virtual collaboration environment.

FIG. 6 illustrates an overview of an example method 600 for updating a property of a virtual collaboration environment. In examples, aspects of method 600 are performed by a device of a collaborator, such as computing devices 106 or 110, or extended reality devices 108 or 112 in FIG. 1. Method 600 begins at operation 602, where an indication of a property update is received. For example, the indication may be received from a server device (e.g., server device 102 in FIG. 1) when a model of a virtual collaboration environment (e.g., as may be stored by a collaboration environment data store such as collaboration environment data store 118) is added or updated. For example, the model may be added or updated using a computer-aided design application, such as computer-aided design application 120 in FIG. 1.

At operation 604, a notification is generated of the updated property. In some instances, the indication at operation 602 comprises a description of the property or a description of one or more changes that were made. Accordingly, at operation 604, such descriptive information may be presented as part of the generated notification. The notification may prompt the collaborator for user input indicating whether a model currently presented in the virtual collaboration environment should be updated or, as another example, whether the model should be added to the virtual collaboration environment.

Flow progresses to operation 606, where a user response to the notification is received. For example, the user response may comprise actuating a user interface element or providing voice input, among other input techniques. In some instances, the notification may be presented to the user for a predetermined amount of time, such that the user response comprises inaction by the collaborator (at least with respect to the notification) for the predetermined amount of time.

At determination 608, it is determined whether there was a user indication to update the collaboration environment to incorporate the property. If it is determined that there was not such a user indication, flow branches "NO" and terminates at operation 610.

If, however, it is determined that there was a user indication to update the collaboration environment, flow instead branches "YES" to operation 612, where a property associated with the property update indication is accessed. For example, the property may be accessed from a collaboration environment data store, such as collaboration environment data store 118 in FIG. 1. As another example, the property may be accessed from the device at which the property was updated or created using a computer-aided design application. In some instances, the indication received at operation 602 may comprise the property, such that operation 612 may be omitted.

Flow progresses to operation 614, where the collaboration environment is updated according to the accessed property. For example, the property may be placed within the virtual collaboration environment. The property may be placed according to a position of a previous instance of the property, according to a position indicated by the collaborator of the device performing method 600, or according to a position specified by another collaborator, among other examples. Flow terminates at operation 614. It will be appreciated that, in other examples, a user need not be prompted prior to updating a property or incorporating a new property into a virtual collaboration environment. In such instances, operations 604-610 may be omitted.

Figure 7:
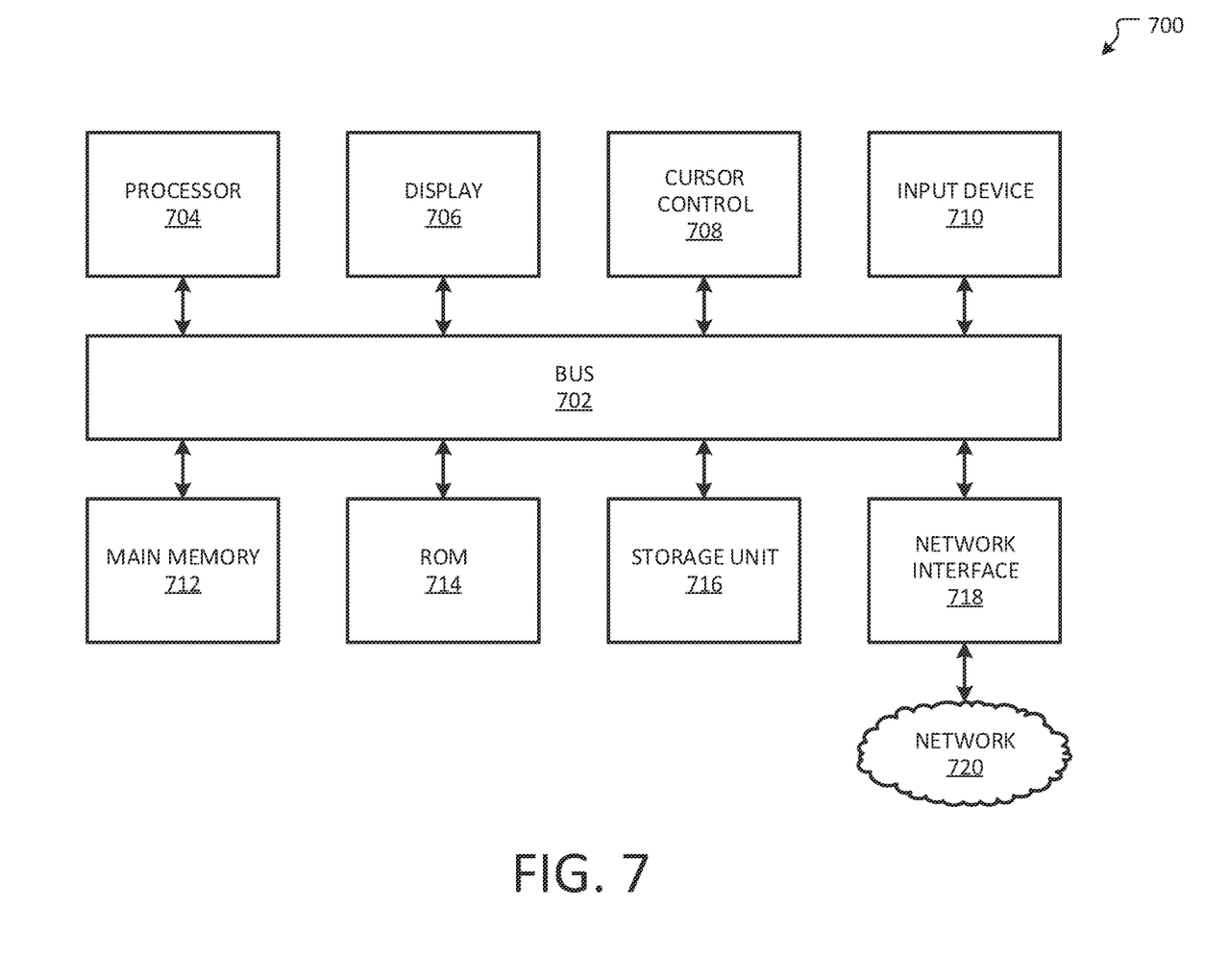
FIG. 7 illustrates a diagram of a computing system for providing the virtual collaboration environment aspects described herein.

FIG. 7 illustrates a diagram of a computing system 700 for providing the virtual collaboration environment aspects described herein. For example, some or all of the functions of server device 102 (e.g., collaboration environment manager 114, perspective rendering engine 116, and collaboration environment data store 118), computing devices 106 and 110 (e.g., and computer-aided design application 120), and/or extended reality devices 108 and 112 may be performed by a computing system that has similar components as the computing system 700. This diagram is merely an example, which should not unduly limit the scope of the claims. One of ordinary skill in the art would recognize many variations, alternatives, and modifications.

The computing system 700 includes a bus 702 or other communication mechanism for communicating information between, a processor 704, a display 706, a cursor control component 708, an input device 710, a main memory 712, a read only memory (ROM) 714, a storage unit 716, and/or a network interface 718. In some examples, the bus 702 is coupled to the processor 704, the display 706, the cursor control component 708, the input device 710, the main memory 712, the read only memory (ROM) 714, the storage unit 716, and/or the network interface 718. And, in certain examples, the network interface 718 is coupled to a network 720 (e.g., the network 104).

In some examples, the processor 704 includes one or more general purpose microprocessors. In some examples, the main memory 712 (e.g., random access memory (RAM), cache and/or other dynamic storage devices) is configured to store information and instructions to be executed by the processor 704. In certain examples, the main memory 712 is configured to store temporary variables or other intermediate information during execution of instructions to be executed by processor 704. For example, the instructions, when stored in the storage unit 716 accessible to processor 704, render the computing system 700 into a special-purpose machine that is customized to perform the operations specified in the instructions (e.g., according to methods 300, 400, 500, and/or 600 of FIGS. 3, 4, 5, and 6, respectively). In some examples, the ROM 714 is configured to store static information and instructions for the processor 704. In certain examples, the storage unit 716 (e.g., a magnetic disk, optical disk, or flash drive) is configured to store information and instructions.

Thus, computing system 700 may include at least some form of computer readable media. The computer readable media may be any available media that can be accessed by processor 704 or other devices. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may not include communication media.

In some embodiments, the display 706 (e.g., a cathode ray tube (CRT), an LCD display, or a touch screen) is configured to display information to a user of the computing system 700. In some examples, the input device 710 (e.g., alphanumeric and other keys) is configured to communicate information and commands to the processor 704. For example, the cursor control 708 (e.g., a mouse, a trackball, or cursor direction keys) is configured to communicate additional information and commands (e.g., to control cursor movements on the display 706) to the processor 704.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The following clauses are provide as example aspects of the disclosed subject matter:

1. A system comprising: at least one processor; and memory storing instructions that, when executed by the at least one processor, causes the system to perform a set of operations, the set of operations comprising: receiving, as part of a collaboration session, perspective information associated with a shared perspective in a virtual collaboration environment of a presenting collaborator, wherein the virtual collaboration environment comprises a property; rendering, based on the received perspective information, the virtual collaboration environment comprising the property; receiving updated perspective information associated with the shared perspective of the presenting collaborator; and in response to receiving the updated perspective information, rendering the virtual collaboration environment based on the updated perspective information.

2. The system of clause 1, wherein the set of operations further comprises: receiving user input indicating an adjustment to the shared perspective; and in response to the received user input, rendering the virtual collaboration environment according to the adjustment.

3. The system of clause 2, wherein the set of operations further comprises: determining that the adjustment to the shared perspective is within a predetermined threshold.

4. The system of any one of clauses 1-3, wherein the set of operations further comprises: receiving an indication to stop viewing the shared perspective of the presenting collaborator; and in response to the received indication, rendering the virtual collaboration environment using a previous perspective.

5. The system of clause 4, wherein rendering the virtual collaboration environment using the previous perspective comprises rendering a virtual avatar associated with the presenting collaborator.

6. The system of any one of clauses 1-5, wherein the set of operations further comprises: receiving an indication of an update to the property; accessing an updated version of the property; and rendering the virtual collaboration environment comprising the updated version of the property.

7. The system of any one of clauses 1-6, wherein the perspective information and the updated perspective information are received from a device of the presenting collaborator.

8. The system of any one of clauses 1-7, wherein the perspective information and the updated perspective information are received from an intermediary server device.

9. The system of any one of clauses 1-8, wherein the property is a three-dimensional model.

10. A method for providing a virtual collaboration environment, comprising: receiving, from a first computing device, an indication to initiate sharing of a perspective of a collaborator in the virtual collaboration environment; providing, to a second computing device, the indication to initiate sharing; receiving, from the first computing device, perspective information associated with the perspective of the collaborator in the virtual collaboration environment; providing, to the second computing device, the perspective information; receiving, from the second computing device, an adjustment to the perspective of the collaborator in the virtual collaboration environment; and providing, to the first computing device, the adjustment to the perspective of the collaborator in the virtual collaboration environment.

11. The method of clause 10, further comprising: receiving an indication of an update to a property of the virtual collaboration environment; and providing, to the second computing device, an indication that the property has been updated.

12. The method of clause 11, further comprising: receiving, from the second computing device, a request for an updated version of the property; and in response to the received request, providing the updated version of the property.

13. The method of any one of clauses 10-12, further comprising: receiving, from the first computing device, an updated property associated with a property of the virtual collaboration environment; storing the updated property in a collaboration environment data store; and providing, to the second computing device, an indication of the updated property.

14. A method for providing a virtual collaboration environment, comprising: receiving, from a first device as part of a collaboration session, perspective information associated with a shared perspective in a virtual collaboration environment of a presenting collaborator associated with the first device, wherein the virtual collaboration environment comprises a property; rendering, at a second device and based on the received perspective information, the virtual collaboration environment comprising the property; receiving, from the first device, updated perspective information associated with the shared perspective of the presenting collaborator; and in response to receiving the updated perspective information, rendering the virtual collaboration environment based on the updated perspective information.

15. The method of clause 14, further comprising: receiving, at the second device, user input indicating an adjustment to the shared perspective; determining that the adjustment to the shared perspective is within a predetermined threshold; and based on determining that the adjustment to the shared perspective is within the predetermined threshold, rendering the virtual collaboration environment according to the adjustment.

16. The method of any one of clauses 14-15, further comprising: receiving, from the first device, an indication of an update to the property; and updating the virtual collaboration environment to comprise the updated version of the property.

17. The method of clause 16, wherein the property is a three-dimensional model.

18. The method of clause 17, wherein the indication of the update to the property is associated with a computer-aided design application.

19. The method of any one of clauses 14-18, further comprising: receiving, from the first device, an indication to stop viewing the shared perspective; and in response to the received indication, rendering the virtual collaboration environment using a previous perspective.

20. The method of clause 19, wherein rendering the virtual collaboration environment using the previous perspective comprises rendering a virtual avatar associated with the presenting collaborator.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a plurality of extended reality devices, each including a display;
a server including:
at least one processor; and
memory storing instructions that, when executed by the at least one processor, causes the system to perform a set of operations, the set of operations comprising:
receiving, as part of a collaboration session between a set of collaborators, perspective information associated with a shared perspective in a virtual collaboration environment of a presenting collaborator of the set of collaborators from an extended reality device of the presenting collaborator, wherein:
the virtual collaboration environment comprises a three-dimensional property; and
the shared perspective indicates at least one of a position or an orientation from which the presenting collaborator views the three-dimensional property within the virtual collaboration environment;
rendering, at a display of an extended reality device of another collaborator of the set of collaborators and based on the received perspective information, the virtual collaboration environment comprising the three-dimensional property according to the position and orientation of the shared perspective, including rendering for the another collaborator the virtual collaboration environment from the shared perspective;
receiving, at the system, user input from the another collaborator indicating an adjustment to the at least one of the position or the orientation of the shared perspective of the presenting collaborator within a predetermined threshold, wherein the adjustment is limited by the predetermined threshold;
in response to receiving the user input, rendering the virtual collaboration environment according to the adjustment at the extended reality device of the another collaborator, thereby translating the at least one of the position or the orientation of the shared perspective of the presenting collaborator for presentation at the display to the another collaborator; and
presenting the shared perspective, based on the adjustment, at the extended reality device of the presenting collaborator concurrently with rendering the virtual collaboration environment according to the adjustment at the extended reality device of the another collaborator.

2. The system of claim 1, wherein the set of operations further comprises:
receiving an indication to stop viewing the shared perspective of the presenting collaborator; and in response to the received indication, rendering the virtual collaboration environment using a previous perspective of the another collaborator.

3. The system of claim 2, wherein rendering the virtual collaboration environment using the previous perspective comprises rendering a virtual avatar associated with the presenting collaborator.

4. The system of claim 1, wherein the set of operations further comprises: receiving an indication of an update to the three-dimensional property;

accessing an updated version of the three-dimensional property; and rendering the virtual collaboration environment comprising the updated version of the three-dimensional property.

5. The system of claim 1, wherein the perspective information is received from a device of the presenting collaborator.

6. The system of claim 1, wherein the perspective information is received from an intermediary server device.

7. The system of claim 1, wherein the three-dimensional property is a three-dimensional model.

8. The system of claim 1, wherein the set of operations further comprises:

receiving updated perspective information for the presenting collaborator; and rendering the virtual collaboration environment according to the updated perspective information, wherein the updated perspective information is translated according to the adjustment for display to the another collaborator.

\* \* \* \* \*